United States Patent [19]

Cole

[11] Patent Number: 5,275,030
[45] Date of Patent: Jan. 4, 1994

[54] STEERING WHEEL MOUNTED ANTI-THEFT DEVICE FOR VEHICLES

[76] Inventor: Thomas J. Cole, One Picardy La., St. Louis, Mo. 63124

[21] Appl. No.: 924,956

[22] Filed: Aug. 5, 1992

[51] Int. Cl.⁵ .................................. B60R 25/02
[52] U.S. Cl. ........................... 70/209; 70/226; 70/227
[58] Field of Search .............. 70/209, 211, 212, 225, 70/226, 227, 237, 238, 210

[56] References Cited

U.S. PATENT DOCUMENTS

| | | | |
|---|---|---|---|
| 1,154,389 | 9/1915 | Fogalsang | 70/209 |
| 1,218,856 | 3/1917 | Gulden | 70/212 |
| 1,228,123 | 5/1917 | McDermott | 70/212 |
| 1,329,913 | 2/1920 | McGuire | 70/212 |
| 1,364,068 | 1/1921 | Brader | 70/212 |
| 1,395,532 | 11/1921 | Tilden | 70/209 |
| 1,924,987 | 8/1933 | Furino | 70/26 |
| 3,401,543 | 9/1968 | Lewis | 70/226 |
| 4,304,110 | 12/1981 | Fain | 70/209 |
| 4,699,238 | 10/1987 | Tamir | 70/238 X |
| 4,722,205 | 2/1988 | Miranda | 70/225 X |
| 4,829,797 | 5/1989 | Wu | 70/209 |
| 4,882,920 | 11/1989 | Wu | 70/209 |
| 4,887,443 | 12/1989 | Wang | 70/209 |
| 4,949,561 | 8/1990 | Solow et al. | 70/209 |
| 5,007,259 | 4/1991 | Mellard | 70/226 X |
| 5,024,069 | 6/1991 | Hull, Jr. et al. | 70/209 |
| 5,025,646 | 6/1991 | Waguespack, Jr. | 70/209 |
| 5,031,429 | 7/1991 | Wang | 70/209 |
| 5,097,685 | 3/1992 | Lien | 70/209 |

FOREIGN PATENT DOCUMENTS

| | | | |
|---|---|---|---|
| 419557 | 4/1947 | Italy | 70/212 |
| 42412 | 2/1926 | Norway | 70/211 |

*Primary Examiner*—Lloyd A. Gall
*Attorney, Agent, or Firm*—Armstrong, Teasdale, Schlafly & Davis

[57] ABSTRACT

An anti-theft device for vehicles having a steering wheel mounted on a steering column and having a hub, a plurality of spokes, and a rim, for securing onto the steering wheel of the vehicle to interfere with or prevent steering the vehicle. The device includes a jacket adapted to be mounted over the hub of the steering wheel; and a locking bar that interfits with the jacket to surround the steering column and secure the device on the steering wheel with the shaft on the locking bar extending between two spokes. The jacket and the locking bar are secured with a lock on the end of the locking bar shaft that extends between two spokes. The locking bar includes an arm that extends beyond the periphery of the steering wheel when the device is secured on the steering wheel to interfere with or prevent turning the steering wheel.

18 Claims, 2 Drawing Sheets

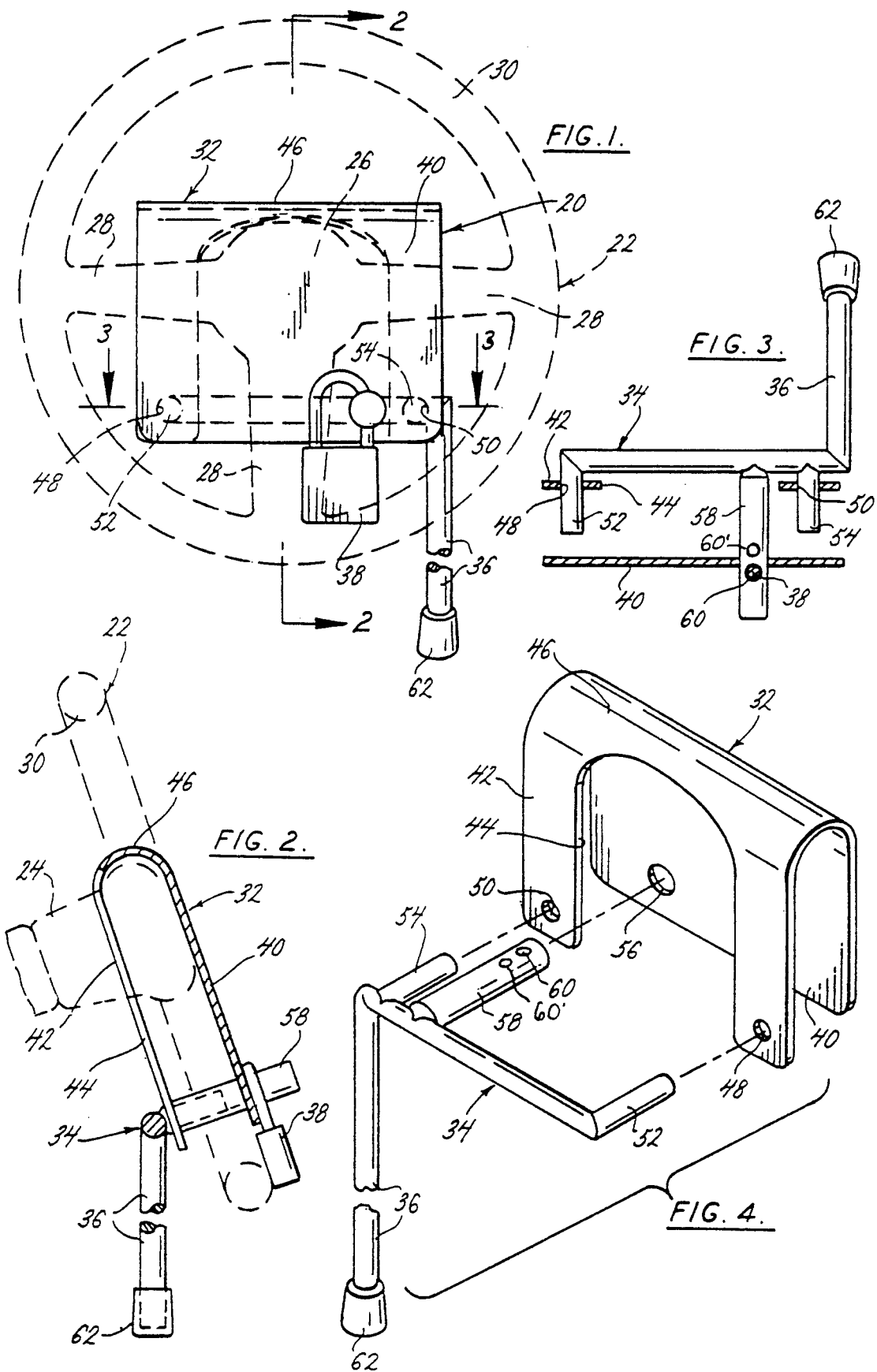

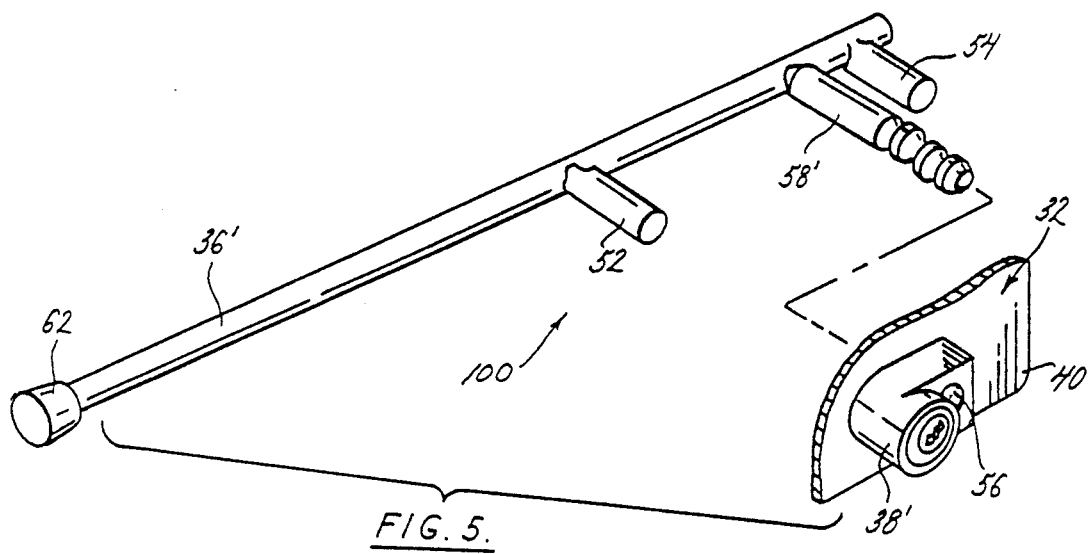
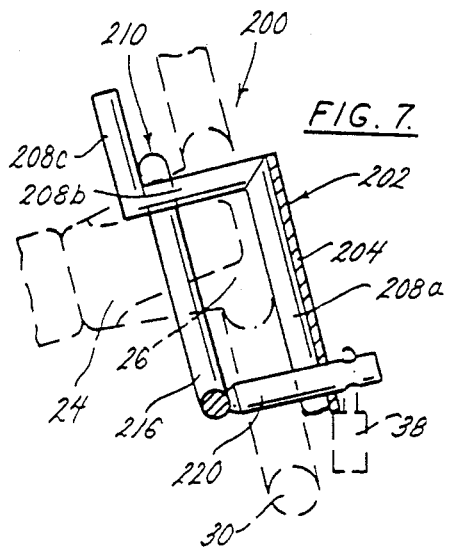
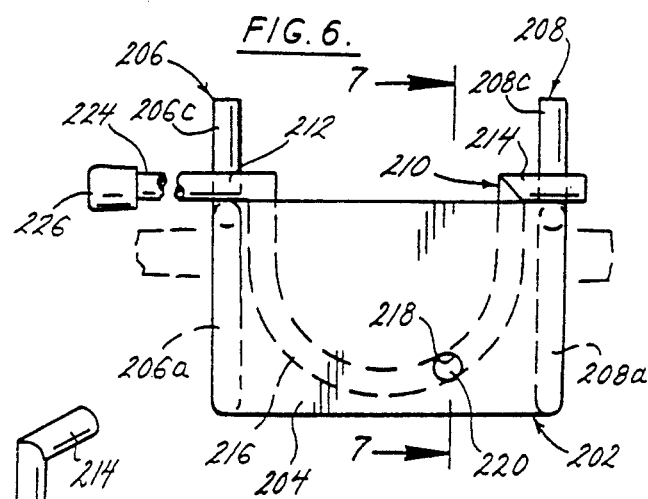
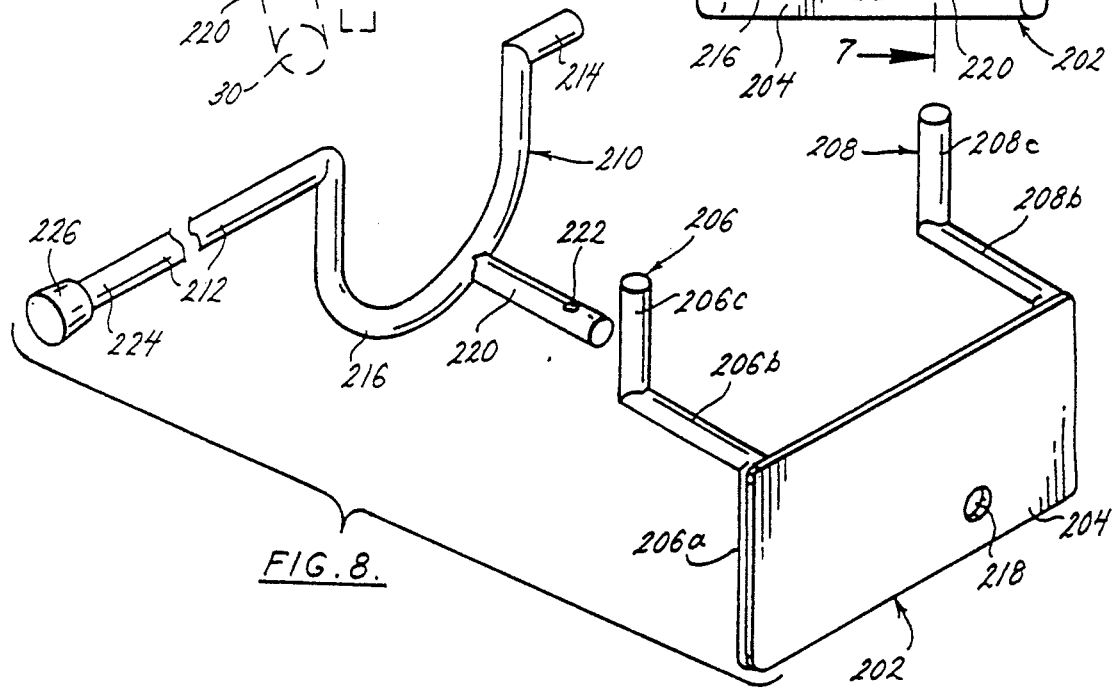

STEERING WHEEL MOUNTED ANTI-THEFT DEVICE FOR VEHICLES

BACKGROUND AND SUMMARY OF THE INVENTION

This invention relates to an anti-theft device for vehicles having a steering wheel mounted on the end of a steering column, and in particular to a device adapted to be secured to the steering wheel of such vehicles to interfere with or prevent steering the vehicle, thereby discouraging theft.

Various types of motor vehicle anti-theft devices have been developed which operate on the principle of locking or interfering with the operation of the steering wheel of the vehicle. For example, Tilden, U.S. Pat. No. 1,395,532, discloses a device for completely enclosing a steering wheel, and thereby preventing operation of the vehicle. Wauguespack, Jr., U.S. Pat. No. 5,025,646, discloses locking the steering wheel to the dashboard to prevent steering. One currently popular type of anti-theft device is a bar adapted to extend across the steering wheel of the vehicle, and beyond the rim of the steering wheel to interfere with or prevent the steering of the vehicle. Examples of such devices are disclosed in Fain, U.S. Pat. No. 4,304,110; Wang, U.S. Pat. No. 4,887,443; and Solow et al., U.S. Pat. No. 4,949,561. There are several other anti-theft devices that attach to, or extend from, the steering wheel to interfere with or prevent steering, including Wu, U.S. Pat. Nos. 4,882,920, and 4,829,797; Mellard, U.S. Pat. No. 5,007,259; Wang, U.S. Pat. No. 5,031,429; and Lien, U.S. Pat. No. 5,097,685.

One major disadvantage of the anti-theft devices previously available is that they typically rely on engagement with the rim of the steering wheel, which is not made from a high hardness material. Thus, these anti-theft devices could be easily defeated by simply cutting through the rim of the steering wheel with bolt cutters, and removing the anti-theft device.

The anti-theft device of the present invention is adapted to be secured over the hub of the steering wheel and around the steering column of the vehicle and provide an arm extending beyond the rim of the steering wheel to interfere with or prevent steering of the vehicle. Generally, the device comprises a jacket adapted to fit over the hub of the steering wheel, and a locking bar, releasably engageable with the jacket, which cooperates with the jacket to surround the steering column and secure the device on the hub by means of a shaft that extends between two spokes, restricting the steering wheel from moving independently of the device. The locking bar includes an arm that extends beyond the periphery of the steering wheel when the device is properly installed over the hub to interfere with or prevent turning the steering wheel. A lock secures the jacket and the locking bar together on the steering wheel.

The anti-theft device is of simple construction, and it is easy to install and remove from the steering wheel. The device is installed by simply placing the jacket over the hub, fitting the locking bar into place, and securing it with the lock. The lock can be made integral with the jacket to reduce the number of parts and to further simplify installation. The device surrounds the hub of the steering wheel and the steering column, and engages the spokes of the steering wheel, and cannot be defeated by cutting through the rim of the steering wheel. Thus, the arm of the locking bar is securely mounted to project beyond the periphery of the steering wheel and interfere with or prevent turning the steering wheel. The device can be constructed to fit a wide variety of makes and models of motor vehicles.

These and other features and advantages will be in part apparent, and in part pointed out hereinafter.

BRIEF DESCRIPTION OF THE DRAWINGS

FIG. 1 is a front elevation view of a first embodiment of an anti-theft device constructed according to the principles of this invention, shown as it would be mounted on the steering wheel of a vehicle (shown in phantom);

FIG. 2 is a vertical cross-sectional view of the first embodiment, taken along the plane of line 2—2 in FIG. 1;

FIG. 3 is a horizontal cross-sectional view of the first embodiment, taken along the plane of line 3—3 in FIG. 1;

FIG. 4 is a rear perspective view of the first embodiment, showing how the jacket and the locking bar interfit;

FIG. 5 is a partial exploded perspective view of a second embodiment of an anti-theft device constructed according to the principles of this invention, in which the look is integral with the jacket;

FIG. 6 is a front elevation view of a third embodiment of an anti-theft device constructed according to the principles of this invention;

FIG. 7 is a vertical cross-sectional view of the third embodiment, taken along the plane of line 7—7 in FIG. 6, shown as it would be mounted on the steering wheel of a vehicle (shown in phantom); and FIG. 8 is an exploded perspective view of the third embodiment.

Corresponding reference numerals indicate corresponding parts throughout the several views of the drawings.

DETAILED DESCRIPTION OF THE PREFERRED EMBODIMENTS

A first embodiment of an anti-theft device constructed according to the principles of this invention, indicated generally as 20, is shown in FIG. 1 as it would be installed on the steering wheel 22 (shown in phantom) of a vehicle. The steering wheel 22 is of a conventional type, mounted on the end of steering column 24, and generally comprising a hub 26, a plurality of spokes 28 extending from the hub, and a rim 30.

The device 20 comprises a jacket 32, adapted to fit over the hub 26 of the steering wheel 22, and a locking bar 34 that interfits with the jacket to secure the device on the steering wheel. The locking bar has an arm 36 that extends beyond the rim 30 of the steering wheel when the device is properly installed on the steering wheel to interfere with or prevent turning the steering wheel. A lock 38 secures the jacket 32 and the locking bar 34 on the steering wheel The jacket 32 comprises a front panel 40 adapted to overlie the hub 26 of the steering wheel 22, and a back panel 42. The back panel 42 has a downwardly facing opening 44 in its bottom edge, adapted to receive the steering column 24, surrounding the steering column on the top and sides. The front and back panels 40 and 42 are joined at their top edges by a top 46, which can be arched, as shown in the Figures, or flat. The jacket 32 traps one or more of the spokes 28 between the front and back panels 40 and 42, to help secure the device 20 on the steering wheel 22.

The locking bar 34 is configured to interfit with the jacket 32, and cooperates with the jacket to encircle the steering column 24. When installed on the jacket 32, the locking bar 34 extends adjacent to the mouth of the downwardly-facing opening 44 in the back panel 42 of the jacket 32, from one side of the mouth to the other. Openings 48 and 50 are provided in the back panel 42, on opposite sides of the mouth of the opening 44. Studs 52 and 54 extend perpendicularly from the locking bar 34, and are adapted to fit in the openings 48 and 50, respectively, in the back panel 42 of the jacket 32. The studs 52 and 54 project through the opening 48 and 50 in the back panel, at least partway toward the front panel 40, to give rigidity to the device and preferably sufficiently so that the back panel 42 cannot be bent out of engagement with the studs.

An opening 56 is provided in the front panel 40 of the jacket 32 for securing the locking bar 34 and the jacket 32 together. The locking bar 34 has a shaft 58, extending generally perpendicularly to the longitudinal axis of the locking bar, which can extend through the opening 56. A bore 60 extends transversely through the shaft 58, adjacent the free end, for receiving the shackle of the lock 38. Additional bores 60' can be provided so that the device can be mounted on various types and styles of steering wheels. When the locking bar 34 is properly engaged with the jacket 32 so that the studs 52 and 54 extend through the openings 48 and 50, and the shaft 58 extends through the opening 56, the lock 38 can be secured on the end of the shaft to hold the locking bar and jacket together, and retain the device 20 on the hub 26 of the steering wheel 22. The lock 38 may be either a key lock as shown, or a combination lock, as is well known in the art.

The arm 36 extends perpendicularly from the longitudinal axis of the locking bar, at one end. The free end of the arm 36 can be provided with a protective cap 62. When the device 20 is properly installed on the steering wheel 22, the arm 36 interferes with or prevents turning the steering wheel by engaging the driver's legs, or some part of the vehicle such as the door, the center console, or the windshield, etc.

The jacket 32 and the locking bar 34 are preferably made of a hard, tough steel of sufficient thickness and hardness to resist cutting. A 12%-14% manganese steel would also be particularly suited for this application because it work hardens and thus is resistant to cutting. The locking bar 34 can be assembled from a plurality of separate pieces welded together.

A second embodiment of an anti-theft device is indicated generally as 100 in FIG. 5. The anti-theft device 100 is substantially similar to device 20, and thus most of the parts are not shown. FIG. 5 illustrates the differences between device 100 and device 20. The corresponding parts that are shown, however, are identified with corresponding reference numerals.

One of the differences between the device 100 and the device 20 is that rather than the separate lock 38 used in the device 20, in the device 100 the lock 38' is integral with the jacket. Another difference is that rather than the bore 60 in the end of shaft 58 in device 20, the end of the shaft 58' in device 100 is ratcheted to be engaged by the lock 38, when it is inserted through the opening 56.

Another difference between the device 100 and the device 20 is that the arm 36' on the locking bar 34' extends longitudinally with respect to the locking bar 34', rather than extending perpendicularly as arm 36 does with respect to locking bar 34. Of course, this configuration of the locking bar 34 could be incorporated into the first embodiment, if desired, or the configuration of the arm 36 of the first embodiment could be incorporated into the second embodiment.

Rather than providing a separate lock 38, as in device 20, or a lock 38' integral with the jacket 32, as in device 100, the lock could be made integral with the shaft 58 and adapted to engage the opening 56 or a special strike in or around the opening.

A third embodiment of an anti-theft device constructed according to the principles of this invention is indicated generally as 200 in FIGS. 6-8. The anti-theft device 200 comprises a jacket 202, comprising a plate 204 that is adapted to extend over the hub 26 of the steering wheel 22. The jacket 202 also comprises generally "Z"-shaped mounting brackets 206 and 208 on opposite sides of the plate 204. The brackets 206 and 208 comprise first portions 206a and 208a that extend vertically adjacent the side edges of the plate 204, second portions 206b and 208b that extend generally horizontally from the upper ends of the first portions 206a and 208a and rearwardly from the plate 204, and third portions 206c and 208c that extend generally perpendicularly upwardly from the ends of the second portions 206b and 208b.

A locking bar 210 is adapted to engage the jacket 202, interfitting with the jacket 202 to secure the device 200 over the hub 26 and on the end of the steering column 24. The locking bar 210 has a first and second portions 212 and 214 adapted to engage the brackets 206 and 208, and a generally U-shaped intermediate portion 216 therebetween that is adapted to extend downwardly under and around the steering column, surrounding the steering column on the bottom and sides. When the locking bar 210 and jacket 202 are properly interfit, they in effect surround the steering column.

An opening 218 is preferably provided in the front of the jacket 202, and the locking bar 210 preferably has a shaft 220 extending generally perpendicular to the plane of the locking bar, that can extend through the opening 218. A bore 222 extends transversely through the shaft 220, adjacent the free end, for receiving the shackle of lock 38. When the locking bar 210 is properly engaged with the jacket 202, with the portions 212 and 214 overlying the brackets 206 and 208, and the shaft 220 extending through the opening 218, the lock 38 can be secured on the end of the shaft to hold the locking bar and jacket together, and retain them on the hub of the steering wheel. The lock may be either a key lock, as shown, or a combination lock, as is well known in the art. Alternatively, the lock could be integral with the jacket 202 or the shaft 220, as described above with respect to the second embodiment.

The locking bar 210 has an arm 224 extending longitudinally at one end of the locking bar, similar to the arm 36' on device 100. The end of the arm 224 can be provided with a protective cap 226. The arm extends beyond the periphery of the steering wheel 22 when the device 200 is properly engaged on the steering wheel, to interfere with or prevent turning the steering wheel.

OPERATION

The device 20 is quickly and easily installed on the steering wheel 22 of a vehicle by fitting the jacket 32 over the hub 26 of the steering wheel 22, with the downwardly-facing opening 44 receiving the steering column 24 so that the back panel 42 of the jacket surrounds the steering column at the top and sides. The jacket 32 will rest in place over the hub. The locking bar 34 is engaged with the jacket. The studs 52 and 54 are aligned with their respective openings 48 and 50, and the shaft 58 is aligned with its opening 56. The studs are advanced through their respective openings, and the shaft is advanced through its opening. When the end of the shaft 58 protrudes sufficiently through the opening 56 to expose the bore 60, the shackle of the lock 38 can be inserted through the bore, to lock the locking bar and the jacket together. With the device 20 thus secured on the steering wheel, the arm 36 interferes with or prevents the steering of the vehicle, hitting the driver, the door, the center console or the windshield, etc., as the driver attempts to turn the wheel. The top 46 of the jacket 32, the studs 52 and 54, and shaft 58 cooperate to engage the spokes 28 of the steering wheel 22 to prevent the steering wheel from turning relative to the device. The back panel 42 and the locking bar cooperate to engage the spokes and the steering column to prevent the device from being pulled from the hub.

The anti-theft device 100 of the second embodiment is also quickly and easily installed. First, the jacket 32 is installed over the hub 26 of the steering wheel 22, so that it rests in place over the hub. The locking bar 34' is then engaged with the jacket. The studs 52 and 54 are aligned with their respective openings 48 and 50, and the shaft 58' is aligned with its opening 56. The studs are advanced through their respective openings, and the shaft is advanced through its opening. The ratcheted end of the shaft 58' ratchets in the lock 38 as it extends through the opening 56. When the end of the shaft 58' protrudes sufficiently through opening 56 for it to be firmly engaged by the lock 38', the locking bar 34' and the jacket 32 are locked together. With the device 100 thus secured on the steering wheel, the arm 36' interferes with or prevents turning the steering wheel, hitting the driver, the door, the center console or the windshield, etc., as the driver attempts to turn the wheel. The top of the jacket 46, the studs 52 and 54, and shaft 58' cooperate to engage the spokes 28 of the steering wheel 22 to prevent the steering, wheel from turning relative to the device 100. The back panel 42 and the locking bar 34' cooperate to engage the spokes 28 and the steering column to prevent the device 100 from being pulled from the hub.

The anti-theft device 200 of the third embodiment is also easily installed on a steering wheel. The locking bar 210 is held behind the steering wheel, with the U-shaped section 216 receiving the steering column, surrounding it on the bottom and sides. The portions 212 and 214 extend generally horizontally from either side of the steering column. The jacket 202 is held horizontally so that the third portions 206c and 208c of the mounting brackets extend generally horizontally rearwardly. The jacket 202 is advanced toward the locking bar 210, with the third portions of the mounting brackets 206c and 208c extending underneath the portions 212 and 214 of the locking bar 210. The jacket is then pivoted downwardly, so that the third portions of the mounting brackets 206c and 208c pivot up, behind the portions 212 and 214 of the locking bar, and the opening 218 in the jacket fits over the end of the shaft 220. The lock 38 is then secured over the end of the shaft 220, to secure the locking bar 210 and the jacket 202 together on the steering wheel. With the device 200 thus secured on the steering wheel, the arm 224 interferes with or prevents turning the steering, hitting the driver, the door, the center console, or the windshield, etc., as the driver attempts to turn the wheel. The brackets 206 and 208 and the shaft 220 cooperate to engage the spokes 28 of the steering wheel 22 to prevent the steering wheel from turning relative to the device 200. The locking bar 210 engages the spokes 28 of the steering wheel 22 to prevent the device 200 from being pulled from the hub 26.

Thus the anti-theft devices of the invention quickly, easily, and securely mount over the steering wheel hub, and cannot be defeated by cutting the rim of the steering wheel as in the case with the prior art. The arm interferes with or prevents turning the wheel, and thus with steering the vehicle. The anti-theft device is readily adaptable to a variety of motor vehicles.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limited sense.

What is claimed is:

1. An anti-theft device for vehicles having a steering wheel mounted on a steering column and having a hub, a plurality of spokes, and a rim, the device adapted to be secured to the steering wheel of the vehicle to interfere with or prevent turning the steering wheel, and comprising:

a jacket adapted to be mounted over the top surface of the hub of the steering wheel and the steering column;

a locking bar that interfits with the jacket to completely surround the steering column and secure the device on the steering wheel, the locking bar including an arm that extends beyond the periphery of the steering wheel when the device is secured on the steering wheel to interfere with or prevent the turning of the steering wheel; and a lock adapted to secure the jacket and the locking bar together on the steering wheel.

2. The anti-theft device according to claim 1 wherein the jacket has an opening therein, wherein a portion of the locking bar extends through the opening in the jacket, and wherein the lock engages the portion of the locking bar that extends through the opening in the jacket.

3. An anti-theft device for vehicles having a steering wheel mounted on a steering column and having a hub, a plurality of spokes, and a rim, the device adapted to be secured to the steering wheel of the vehicle to interfere with or prevent the steering of the vehicle, and comprising:

a jacket, comprising a front panel adapted to overlie the hub of the steering wheel, and a back panel having an opening with a downwardly-facing mouth for receiving the steering column and surrounding it at the top and sides;

a locking bar adapted to extend generally adjacent the mouth of the opening, from one side of the mouth to the other, when the jacket is positioned on the steering wheel to completely surround the steering column and secure the jacket on the steering wheel, the locking bar having an arm extending beyond the rim of the steering wheel to interfere with or prevent turning the steering wheel;

a lock for securing the jacket and the locking bar.

4. The device according to claim 3 wherein the lock is integral with the jacket.

5. The anti-theft device according to claim 3 wherein there are openings in the back panel of the jacket on opposite sides of the opening, and wherein the locking bar comprises studs adapted to be received in the openings in the back panel to secure the locking bar to the jacket.

6. The anti-theft device according to claim 3 wherein the locking bar comprises a shaft, and wherein the front panel of the jacket has an opening adapted to receive the shaft, and wherein the lock engages a portion of the shaft protruding through the opening in the front panel.

7. The anti-theft device according to claim 6 wherein the lock is integral with the front panel of the jacket and engages a portion of the shaft inserted through the opening in the front panel.

8. The anti-theft device according to claim 6 wherein the lock is a key-operated lock.

9. The anti-theft device according to claim 6 wherein the lock is a combination lock.

10. The anti-theft device according to claim 3 wherein the jacket comprises a top extending between the top edge of the front panel and the top edge of the back panel, trapping at least some of the spokes between the front and back panels.

11. An anti-theft device for vehicles having a steering wheel mounted on a steering column and having a hub, a rim, and spokes extending therebetween, the anti-theft device being adapted to be secured to the steering wheel of the vehicle to interfere with or prevent steering the vehicle, and comprising:

a jacket, comprising a front panel adapted to overlie the front of the hub of the steering wheel, and a back panel having an opening with a downwardly facing mouth for receiving the steering column and surrounding it at the top, and sides, with at least two of the spokes between the panels;

a locking bar adapted to extend under the steering column, generally adjacent the downwardly-facing mouth of the opening in the back panel of the jacket, from one side of the mouth to the other, when the jacket is positioned on the steering wheel to secure the jacket on the steering wheel, the locking bar having a shaft that extends between two spokes, and studs extending at least partway between the back and front panels sufficiently to hold the locking bar in place and prevent the removal of the locking bar by bending the back panel of the jacket, and an arm extending beyond the rim of the steering wheel to interfere with or prevent turning the steering wheel; and a lock for securing the jacket and the locking bar.

12. The anti-theft device according to claim 11 wherein the lock is integral with the jacket.

13. The anti-theft device according to claim 11 wherein the lock is a key-operated lock.

14. The anti-theft device according to claim 11 wherein the lock is a combination lock.

15. An anti-theft device for vehicles having a steering wheel mounted on a steering column and having a hub, a rim, and spokes extending therebetween, the anti-theft device being adapted to be secured to the steering wheel of the vehicle to interfere with or prevent steering the vehicle, and comprising:

a locking bar having a generally U-shaped central section adapted to receive and surround the bottom and sides of the steering column, and having a shaft extending from the U-shaped central section, generally adjacent the bottom of the "U";

a jacket, comprising a front panel adapted to overlie the front of the hub of the steering wheel, and a pair of mounting brackets extending generally rearwardly from the panel adapted to engage the locking bar on opposite sides of the U-shaped central section, the jacket further comprising an opening in the front panel adapted to receive the end of the shaft; and a lock adapted to engage the end of the shaft extending through the opening in the panel.

16. The anti-theft device according to claim 15 wherein the lock is integral with the jacket.

17. The anti-theft device according to claim 15 wherein the lock is a key-operated lock.

18. The anti-theft device according to claim 15 wherein the lock is a combination lock.

* * * * *